(12) United States Patent
Kaneshige et al.

(10) Patent No.: US 11,640,153 B2
(45) Date of Patent: May 2, 2023

(54) CONTROL SYSTEM, SUPPORT DEVICE, AND RECORDING MEDIUM

(71) Applicant: OMRON Corporation, Kyoto (JP)

(72) Inventors: Naruhiko Kaneshige, Otsu (JP); Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 373 days.

(21) Appl. No.: 17/047,689

(22) PCT Filed: Apr. 23, 2019

(86) PCT No.: PCT/JP2019/017148
§ 371 (c)(1),
(2) Date: Oct. 14, 2020

(87) PCT Pub. No.: WO2019/216191
PCT Pub. Date: Nov. 14, 2019

(65) Prior Publication Data
US 2021/0165384 A1    Jun. 3, 2021

(30) Foreign Application Priority Data

May 10, 2018 (JP) .............................. JP2018-091376

(51) Int. Cl.
*G06F 11/32* (2006.01)
*G06F 13/10* (2006.01)
*G05B 19/05* (2006.01)

(52) U.S. Cl.
CPC .......... *G05B 19/056* (2013.01); *G06F 11/323* (2013.01); *G06F 13/10* (2013.01); *G05B 2219/13004* (2013.01)

(58) Field of Classification Search
None
See application file for complete search history.

(56) References Cited

U.S. PATENT DOCUMENTS

2009/0276060 A1* 11/2009 Lu .................. G05B 19/056
                                                    700/86
2018/0210415 A1*  7/2018 Unno ............... G05B 19/056
(Continued)

FOREIGN PATENT DOCUMENTS

EP    2778812 A2 *  9/2014    ......... G05B 19/0426
EP    2902857 A1 *  8/2015    ............ G05B 15/02
(Continued)

OTHER PUBLICATIONS

"International Search Report (Form PCT/ISA/210) of PCT/JP2019/017148," dated Jul. 23, 2019, with English translation thereof, pp. 1-2.

(Continued)

*Primary Examiner* — Isaac Tuku Tecklu
(74) *Attorney, Agent, or Firm* — JCIPRNET

(57) ABSTRACT

A control system, a support device, and a recording medium are provided. This control device includes a storage unit which stores native code generated from a first user program that includes a sequence program, and a calculation processing unit which executes the native code stored in the storage unit. A display device of the present invention includes: a storage unit which stores sequence circuit information that is generated from the first user program and defines a circuit configuration of the sequence program; and a monitor functioning unit which acquires, from the control device, a circuit output state that indicates the execution state of the native code, and visualizes the execution state of the sequence program in the control device on the basis of the acquired circuit output state and the sequence circuit information.

9 Claims, 14 Drawing Sheets

(56) References Cited

U.S. PATENT DOCUMENTS

2018/0284713 A1* 10/2018 Quek .................. G06F 3/03547
2022/0326943 A1* 10/2022 Iwamura .................... G06F 8/71

FOREIGN PATENT DOCUMENTS

| JP | 2003044277 | 2/2003 | | |
|----|------------|--------|---|---|
| JP | 2003122409 | 4/2003 | | |
| JP | 2017037466 | 2/2017 | | |
| WO | WO-2017026290 A1 * | 2/2017 | ........... | G05B 19/056 |
| WO | WO-2017037466 A1 * | 3/2017 | ............. | B26D 3/001 |

OTHER PUBLICATIONS

"Written Opinion of the International Searching Authority (Form PCT/ISA/237) of PCT/JP2019/017148," dated Jul. 23, 2019, with English translation thereof, pp. 1-6.

* cited by examiner

Synchronisation

| | Source | Source Modified Date | Target Modified Date | Target | Detailed Comparison |
|---|---|---|---|---|---|
| ■ ⓘ | ▽ NA5 | | | ▽ NA5 | |
| ☑ ⓘ | ▽ Project | | | ▽ Project | |
| ☐ ⓘ | ▽ Pages | | | ▽ Pages | |
| ☐ ⓘ | └ Page0 | 2018/04/06 16:26:09 | 2018/04/04 09:58:59 | └ Page0 | |
| ☐ | ▽ Subroutines | | | ▽ Subroutines | |
| ☐ | └ SubroutineGroup0 | 2018/04/06 16:26:09 | 2018/04/04 09:58:59 | └ SubroutineGroup0 | 361 |
| ☐ ⓘ | └ Variables | 2018/04/06 16:26:11 | 2018/04/04 09:59:00 | └ Variables | |
| ☐ | └ Global Events | 2018/04/06 16:26:10 | 2018/04/04 09:59:00 | └ Global Events | |
| ☐ | └ Alarms | 2018/04/06 16:26:09 | 2018/04/04 09:59:00 | └ Alarms | |
| ☐ | └ Data Groups | 2018/04/06 16:26:10 | 2018/04/04 09:59:00 | └ Data Groups | |
| ☐ | └ Data Logging | 2018/04/06 16:26:10 | 2018/04/04 09:59:00 | └ Data Logging | |
| ☐ | └ Recipe Templates | 2018/04/06 16:26:10 | 2018/04/04 09:59:00 | └ Recipe Templates | |
| ☐ | └ Project Security | 2018/04/06 16:26:10 | 2018/04/04 09:59:00 | └ Project Security | |
| ☐ | └ Troubleshooter | 2018/04/06 16:26:10 | 2018/04/04 09:59:00 | └ Troubleshooter | |
| ☐ ⓘ | ▽ Languages | | | ▽ Languages | |
| ☐ ⓘ | └ English (United Stat | 2018/04/06 16:26:11 | 2018/04/04 09:59:02 | └ English (United Stat | 362 |
| ☐ | ▽ Settings | | | ▽ Settings | |
| ☐ | └ HMI Settings | 2018/04/06 16:26:11 | 2018/04/04 09:59:00 | └ HMI Settings | |
| ☐ | ▽ User Data | | | ▽ User Data | |
| ☐ | └ User Accounts | 2018/04/06 16:26:08 | 2018/04/04 09:58:59 | └ User Accounts | 363 |
| ☐ | └ Recipe Instances | | | └ Recipe Instances | |
| ☐ | ▽ Resource Files | | | ▽ Resource Files | |
| ☐ | └ Images | 2018/04/06 16:26:09 | 2018/04/04 09:58:59 | └ Images | |
| ☑ ⓘ | ▽ Ladder Data | | | ▽ Ladder Data | |
| ☑ ⓘ | └ new_Controller_0 | 2018/04/06 15:31:38 | | └ new_Controller_0 | 364 |
| ☐ | └ Runtime Files | 2018/03/26 15:20:59 | 2018/03/26 15:20:59 | └ Runtime Files | |

Legend: | Synchronized | Different | Exists only on one side | Not checked |

☑ Store the HMI Project source code on the NA Device (required for uploading the project)
☑ Relink internal devices in the project (valid for Transfer From Device)
☐ Clear the present value of variables with the 'Retain' attribute
☐ Clear Alarm log data from memory
☐ Clear Data log data from memory

366

[ Transfer To Device ] [ Transfer From Device ] [ Recompare ]    [ Close ]

FIG. 14

CONTROL SYSTEM, SUPPORT DEVICE, AND RECORDING MEDIUM

CROSS-REFERENCE TO RELATED APPLICATION

This application is a 371 application of the International PCT application serial no. PCT/JP2019/017148, filed on Apr. 23, 2019, which claims the priority benefits of Japan Patent Application No. 2018-091376, filed on May 10, 2018. The entirety of each of the above-mentioned patent applications is hereby incorporated by reference herein and made a part of this specification.

BACKGROUND

Technical Field

The invention relates to a control system, a support device, and a recording medium for realizing an online monitor.

Description of Related Art

In the field of FA (Factory Automation), it is common to use a control device such as PLC (Programmable Logic Controller) to control a control target such as equipment or machinery. Such a control device is usually connected to a display device that presents various types of information to the user and receives an operation from the user. The state of the control target controlled by the control device is displayed on the display device.

Further, for debugging or the like, there are needs to confirm the execution state of a program (hereinafter, also referred to as "sequence program") arbitrarily created according to the control target and executed by the control device. A function of confirming the execution state of such a sequence program (hereinafter, also referred to as "online monitor") has also been realized on the display device.

For example, Japanese Laid-Open No. 2003-044277 (Patent Document 1) discloses a configuration in which the development environment and the execution environment for a program coexist to improve the efficiency of program development. More specifically, an execution environment similar to PLC is realized on a computer device by using a control runtime unit, and the execution result of the control runtime unit is returned to a programmable display, so as to display the execution state of a ladder program on the programmable display.

RELATED ART

Patent Document

[Patent Document 1] Japanese Laid-Open No. 2003-044277

SUMMARY

Problems to be Solved

In the configuration disclosed in the above-described Japanese Laid-Open No. 2003-044277 (Patent Document 1), in order to realize the same execution environment as PLC, it is necessary to provide a runtime unit on the computer device, which causes a problem that the configuration of the computer device becomes complicated.

An object of the invention is to provide a configuration that allows an online monitor to be easily realized on a display device.

Means for Solving the Problems

A control system according to an embodiment of the invention includes: a control device for controlling a control target; and a display device connected to the control device. The control device includes: a storage unit storing a native code generated from a first user program that includes a sequence program; and a calculation processing unit executing the native code stored in the storage unit. The display device includes: a storage unit storing sequence circuit information that is generated from the first user program and defines a circuit configuration of the sequence program; and a monitor functioning unit acquiring a circuit output state indicating an execution state of the native code from the control device, and visualizing an execution state of the sequence program in the control device based on the sequence circuit information and the acquired circuit output state.

According to the present embodiment, since the control device executes the user program in the form of a native code, the online monitor can be provided even if the circuit component of the sequence program included in the user program cannot be restored.

In the above embodiment, the circuit output state may include a value of each variable being used by the native code executed in the calculation processing unit. According to the present embodiment, the control device may provide only the execution result of the native code to the display device, and the processing load can be prevented from increasing.

In the above embodiment, the sequence circuit information may include, for each circuit defined in the sequence program, information of a type of a circuit component defined and a variable associated with each circuit component. According to the present embodiment, the interpretation required for the online monitor can be easily realized even if the resources available to the display device are limited.

In the above embodiment, the storage unit of the display device may further store an object code generated from a second user program for realizing a screen display on the display device. According to the present embodiment, the processing speed in the display device can be increased.

In the above embodiment, the control system may further include a support device which creates the first user program and the second user program according to a user operation, and generates the native code and the sequence circuit information from the first user program and generates the object code from the second user program.

According to the present embodiment, it is not necessary to prepare support devices separately for the control device and the display device, and the control device and the display device can be linked to provide necessary data to the respective devices.

According to another embodiment of the invention, a support device for a control system which includes a control device for controlling a control target and a display device connected to the control device is provided. The support device includes: a means generating a first user program including a sequence program, which is executed in the control device, according to a user operation; a means generating a second user program for realizing a screen display on the display device according to a user operation;

a means generating a native code to be executed by a calculation processing unit of the control device, and sequence circuit information defining a circuit configuration of the sequence program from the first user program; a means generating an object code to be executed by a calculation processing unit of the display device from the second user program; a means transferring the native code to the control device; and a means transferring the object code and the sequence circuit information to the display device.

According to the present embodiment, since the control device executes the user program in the form of a native code, the online monitor can be provided even if the circuit component of the sequence program included in the user program cannot be restored.

According to yet another embodiment of the invention, a non-transient computer-readable recording medium, recording a support program for a control system which includes a control device for controlling a control target and a display device connected to the control device is provided. The support program enables a computer to execute: a step of generating a first user program including a sequence program, which is executed in the control device, according to a user operation; a step of generating a second user program for realizing a screen display on the display device according to a user operation; a step of generating a native code to be executed by a calculation processing unit of the control device, and sequence circuit information defining a circuit configuration of the sequence program from the first user program; a step of generating an object code to be executed by a calculation processing unit of the display device from the second user program; a step of transferring the native code to the control device; and a step of transferring the object code and the sequence circuit information to the display device.

According to the present embodiment, since the control device executes the user program in the form of a native code, the online monitor can be provided even if the circuit component of the sequence program included in the user program cannot be restored.

Effects

According to the invention, the online monitor can be easily realized on the display device.

BRIEF DESCRIPTION OF THE DRAWINGS

FIG. 14 is a schematic diagram showing an example of the interface screen provided by the support device according to the present embodiment.

DESCRIPTION OF THE EMBODIMENTS

Figure 1:
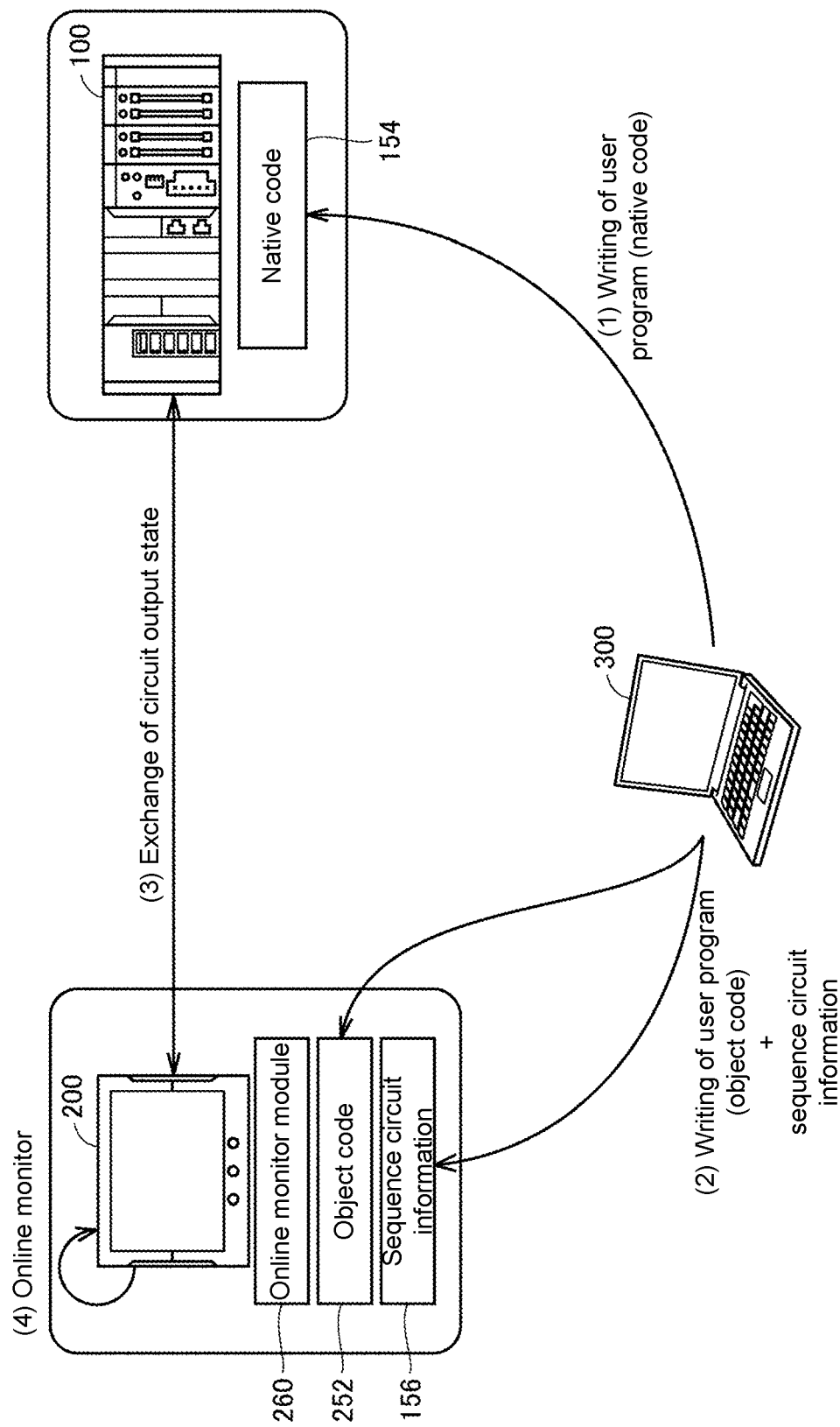
FIG. 1 is a schematic diagram showing a functional configuration example of the control system according to the present embodiment.

Embodiments of the invention will be described in detail with reference to the drawings. The same or corresponding parts in the drawings are denoted by the same reference numerals and description thereof will not be repeated.

A. APPLICATION EXAMPLE

First, an example of a scene to which the invention is applied will be described. FIG. 1 is a schematic diagram showing a functional configuration example of a control system 1 according to the present embodiment. Referring to FIG. 1, the control system 1 includes a control device that controls a control target, and a display device that is connected to the control device. In the following description, the control system 1, which includes a PLC 100 as a typical example of the control device and an HMI (Human Machine Interface) 200 as a typical example of the display device, is shown.

In this specification, a function of confirming the execution state of a user program (sequence program) arbitrarily created according to the control target in the control device is also referred to as "online monitor". The display device (HMI 200) according to the present embodiment acquires necessary information from one or a plurality of control devices (PLC 100) and provides an online monitor.

The international standard IEC61131-3 defines five types of programming languages for PLC application: ladder diagram (LD), function block diagram (FBD), sequential function chart (SFC), instruction list (IL), and structured text (ST). The online monitor according to the present embodiment may be a sequence program written in any programming language. In the following, a sequence program written in a ladder diagram will be described as a typical example.

In this specification, an application program arbitrarily created according to the control target and the control system 1 and executed in the control device (PLC 100) and the display device (HMI 200) is also referred to as a "user program". The user program executed by the control device (PLC 100) includes a sequence program and a motion program created according to the control target. The user program executed by the display device (HMI 200) includes a logic or the like for controlling the layout/attribute or display of an object for realizing screen display.

As shown in FIG. 1, the PLC 100 has a storage unit that stores a native code 154 generated from the user program for PLC (including a sequence program). A calculation processing unit of the PLC 100 executes the native code 154 stored in the storage unit. The control for the control target is realized by execution of the native code 154. This native code 154 is written from a support device 300 to the PLC 100.

Further, the HMI 200 has a storage unit that stores an object code 252 generated from the user program 250 for HMI for realizing screen display on the HMI 200. The storage unit of the HMI 200 further stores sequence circuit information 156 that is generated from the user program for PLC and defines the circuit configuration of the sequence program.

The HMI 200 has an online monitor module 260 for providing the online monitor. The online monitor module 260 acquires a circuit output state indicating the execution state of the native code 154 from the PLC 100. That is, the HMI 200 (online monitor module 260) exchanges the circuit output state with the PLC 100. Then, the online monitor module 260 of the HMI 200 visualizes the execution state of the sequence program in the PLC 100 based on the sequence circuit information 156 and the acquired circuit output state (that is, provide the online monitor).

By adopting such a configuration, even if the user program including the sequence program, which is executed by the PLC 100, has a format such as the native code which cannot reproduce the original sequence program, the online monitor can still be provided in the HMI 200.

B. CONFIGURATION EXAMPLE OF THE CONTROL SYSTEM

Figure 2:
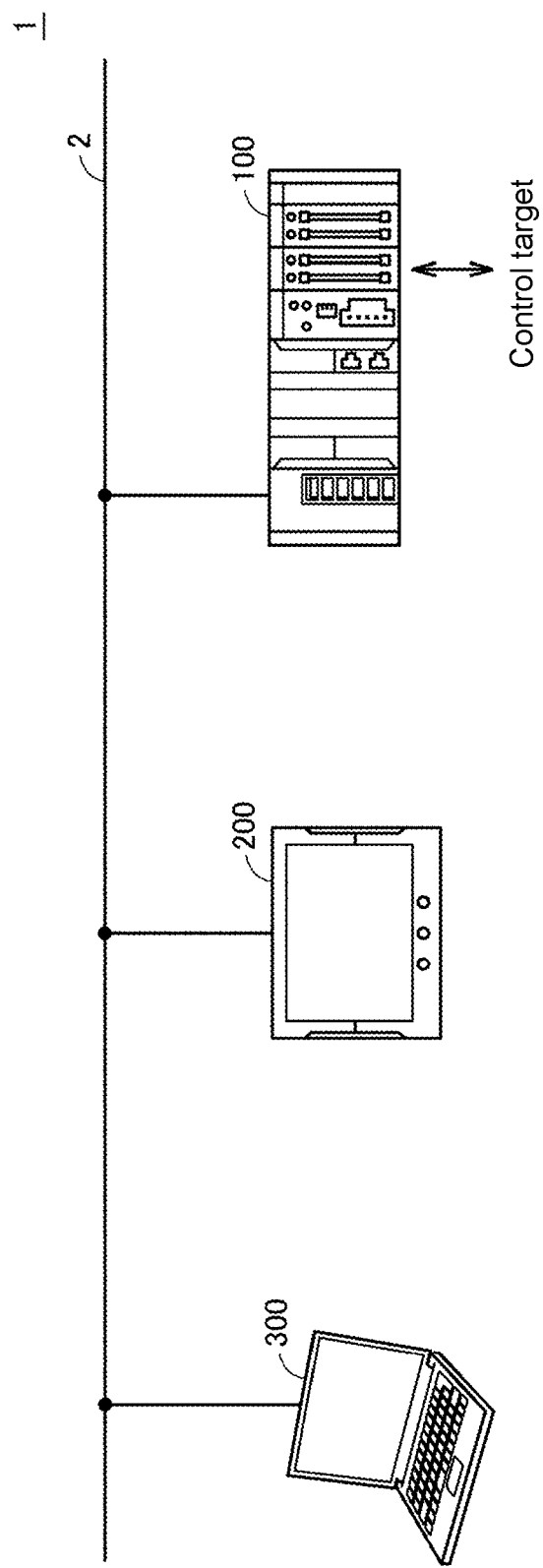
FIG. 2 is a schematic diagram showing a configuration example of the control system according to the present embodiment.

First, a configuration example of the control system according to the present embodiment will be described. FIG. 2 is a schematic diagram showing a configuration example of the control system 1 according to the present embodiment. Referring to FIG. 2, the control system 1 includes the PLC 100 which is a typical example of the control device, the HMI 200 which is a typical example of the display device, and the support device 300. These devices are connected to each other via a network 2.

The PLC 100 controls the control target by executing a control calculation according to a user program (including a sequence program and a motion program) created in advance. The HMI 200 presents various types of information to the user according to a user program created in advance, and receives an operation from the user. The support device 300 provides functions such as creating and debugging the user programs to be executed by the PLC 100 and the HMI 200.

C. HARDWARE CONFIGURATION OF EACH DEVICE INCLUDED IN THE CONTROL SYSTEM 1

Next, an example of the hardware configuration of each device included in the control system 1 will be described.
(c1: PLC 100)

Figure 3:
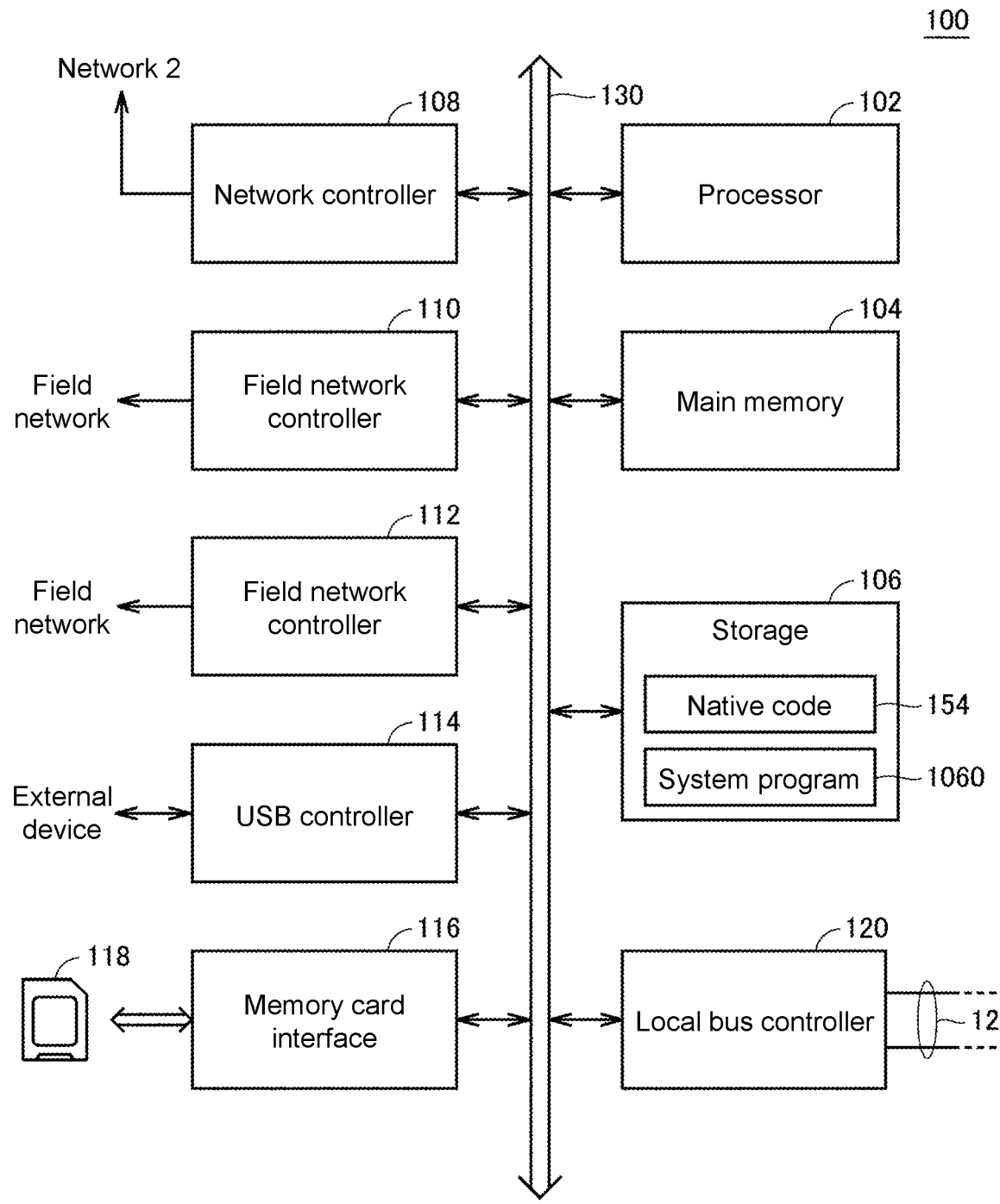
FIG. 3 is a schematic diagram showing an example of the hardware configuration of the PLC according to the present embodiment.

FIG. 3 is a schematic diagram showing an example of the hardware configuration of the PLC 100 according to the present embodiment. Referring to FIG. 3, the PLC 100 includes a processor 102, a main memory 104, a storage 106, a network controller 108, field network controllers 110 and 112, a USB (Universal Serial Bus) controller 114, a memory card interface 116, and a local bus controller 120. These components are connected via a processor bus 130.

The processor 102 corresponds to the calculation processing unit that executes the control calculation, etc., and includes a CPU (Central Processing Unit), a GPU (Graphics Processing Unit) or the like. Specifically, the processor 102 reads the program (for example, system program 1060 and native code 154 (generated from the user program 150)) stored in the storage 106, expands the program in the main memory 104, and executes the program to realize control according to the control target and various processes as described later.

The main memory 104 includes a volatile storage device such as a DRAM (Dynamic Random Access Memory) or an SRAM (Static Random Access Memory). The storage 106 corresponds to the storage unit, and includes a non-volatile storage device such as an HDD (Hard Disk Drive) or an SSD (Solid State Drive).

The storage 106 stores the native code 154 created according to the control target such as equipment or machinery in addition to the system program 1060 for realizing the basic functions.

The network controller 108 exchanges data with any information processing device including the HMI 200 via the network 2. The field network controllers 110 and 112 exchange data with any remote IO device or external device via a field network. Although FIG. 3 shows two field network controllers 110 and 112, one single field network controller may be used. The USB controller 114 exchanges data with any external device or the like via USB connection.

The memory card interface 116 receives a memory card 118 which is an example of a removable recording medium. The memory card interface 116 can write data to the memory card 118 and read various types of data (log, trace data, etc.) from the memory card 118.

The local bus controller 120 exchanges data with any local IO unit via a local bus 12.

Although FIG. 3 shows a configuration example in which the processor 102 executes the program to provide necessary functions, some or all of these provided functions may be implemented by using a dedicated hardware circuit (for example, ASIC (Application Specific Integrated Circuit) or FPGA (Field-Programmable Gate Array)). Alternatively, the main part of the PLC 100 may be realized by using hardware conforming to a general-purpose architecture (for example, an industrial personal computer based on a general-purpose personal computer). In this case, by using a virtualization technique, a plurality of OSs (Operating Systems) having different purposes may be executed in parallel, and the necessary application may be executed on each OS.
(c2: HMI 200)

Figure 4:
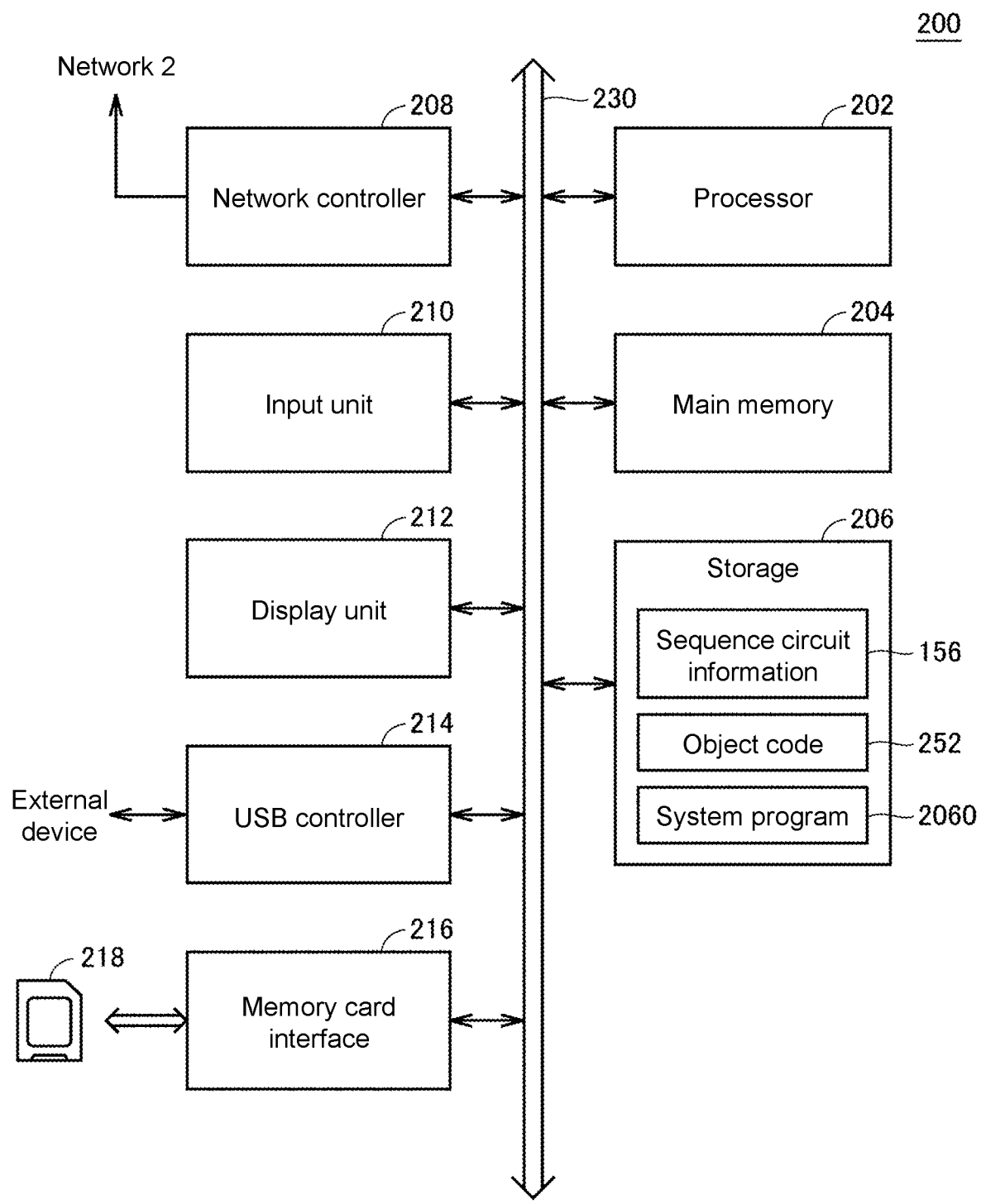
FIG. 4 is a schematic diagram showing an example of the hardware configuration of the HMI according to the present embodiment.

FIG. 4 is a schematic diagram showing an example of the hardware configuration of the HMI 200 according to the present embodiment. Referring to FIG. 4, the HMI 200 includes a processor 202, a main memory 204, a storage 206, a network controller 208, an input unit 210, a display unit 212, a USB controller 214, and a memory card interface 216. These components are connected via a processor bus 230.

The processor 202 corresponds to the calculation processing unit that executes a display process, an input process, etc., and includes a CPU, a GPU or the like. Specifically, the processor 202 reads the program (for example, system program 2060 and object code 252 (generated from the user program 250)) stored in the storage 206, expands the program in the main memory 204, and executes the program to realize the display process and the input process corresponding to the PLC 100.

The main memory 204 includes a volatile storage device such as a DRAM or an SRAM. The storage 206 corresponds to the storage unit, and includes a non-volatile storage device such as an HDD or an SSD.

The storage 206 stores the object code 252 created according to the control target such as equipment or machinery, and the sequence circuit information 156 in addition to the system program 2060 for realizing the basic functions.

The input unit 210 includes a touch panel, a mouse, a keyboard, etc., and receives a user operation. The display unit 212 includes a liquid crystal display, etc., and displays an image, etc. according to the execution result of the object code 252 obtained by the processor 202. The input unit 210 and the display unit 212 may be integrally configured.

The network controller 208 exchanges data with any information processing device including the PLC 100 via the network 2. The USB controller 214 exchanges data with any external device or the like via USB connection.

The memory card interface 216 receives a memory card 218 which is an example of a removable recording medium. The memory card interface 216 can write data to the memory card 218 and read various types of data (log, trace data, etc.) from the memory card 218.

Although FIG. 4 shows a configuration example in which the processor 202 executes the program to provide necessary functions, some or all of these provided functions may be implemented by using a dedicated hardware circuit (for example, ASIC or FPGA). Alternatively, the main part of the HMI 200 may be realized by using hardware conforming to a general-purpose architecture (for example, an industrial personal computer based on a general-purpose personal computer). In this case, by using a virtualization technique, a plurality of OSs having different purposes may be executed in parallel, and the necessary application may be executed on each OS.

(c3: Support Device 300)

Figure 5:
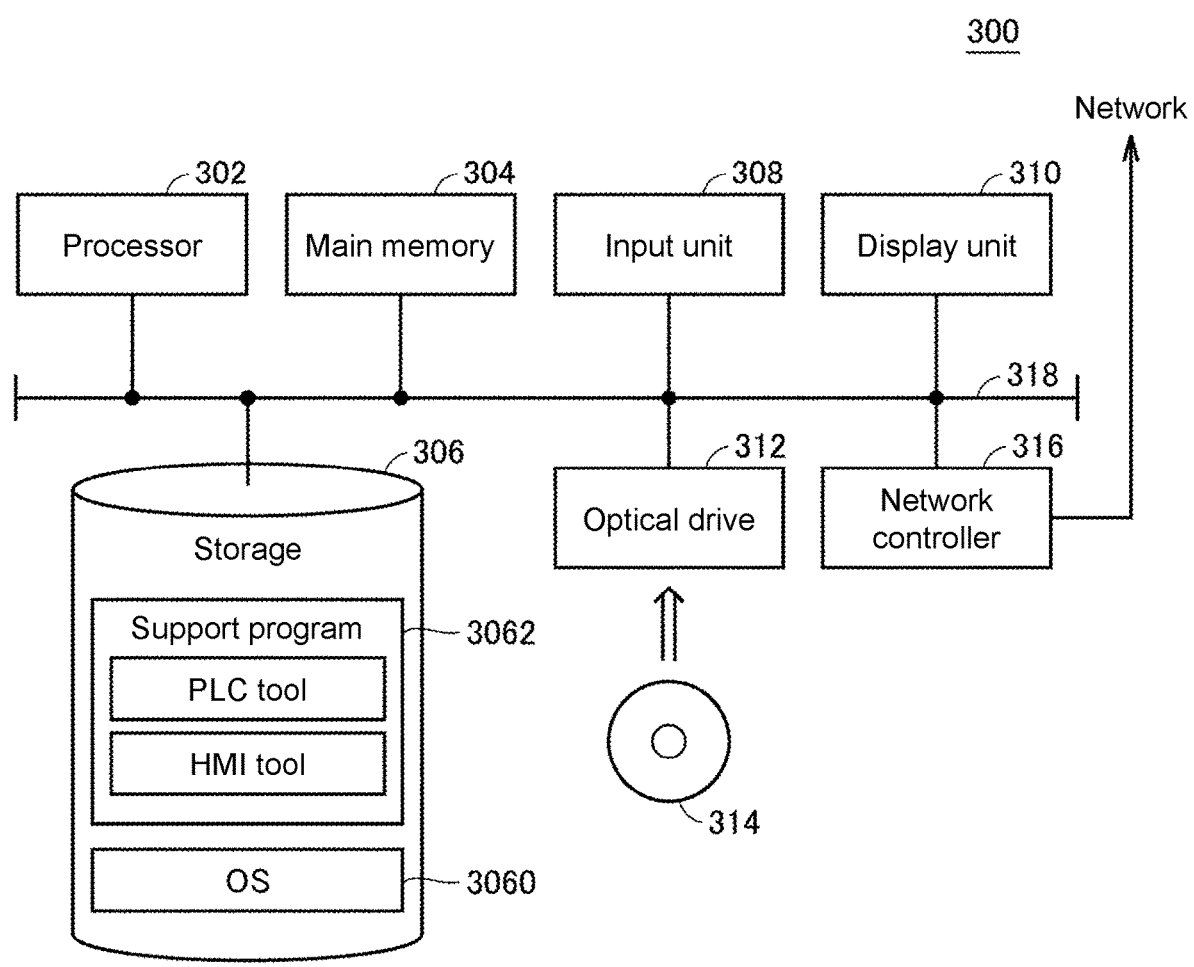
FIG. 5 is a schematic diagram showing an example of the hardware configuration of the support device according to the present embodiment.

FIG. 5 is a schematic diagram showing an example of the hardware configuration of the support device 300 according to the present embodiment. Referring to FIG. 5, the support device 300 is realized by, for example, a computer conforming to a general-purpose architecture executing a program.

More specifically, the support device 300 includes a processor 302, a main memory 304, a storage 306, an input unit 308, a display unit 310, an optical drive 312, and a USB controller 316. These components are connected via a processor bus 318.

The processor 302 includes a CPU, a GPU or the like, and reads the program (for example, OS 3060 and support program 3062) stored in the storage 306, expands the program in the main memory 304, and executes the program to realize various processes as described later.

The main memory 304 includes a volatile storage device such as a DRAM or an SRAM. The storage 306 includes a non-volatile storage device such as an HDD or an SSD.

The storage 306 stores the support program 3062 for providing a function as the support device 300 in addition to the OS 3060 for realizing the basic functions. The support program 3062 has functions as a PLC tool and an HMI tool as described later.

The input unit 308 includes a keyboard, a mouse, etc., and receives a user operation. The display unit 310 includes a display, various indicators, a printer, etc., and outputs the processing result from the processor 302.

The USB controller 316 exchanges data with any external device or the like via USB connection.

The support device 300 has the optical drive 312, and reads the program stored in a recording medium 314 which stores a computer-readable program in a non-transitory manner (for example, an optical recording medium such as a DVD (Digital Versatile Disc)) from the recording medium 314, and installs the program in the storage 306 or the like.

Although the support program 3062, etc. executed by the support device 300 may be installed via the computer-readable recording medium 314, it may also be installed by downloading from a server device, etc. on a network. In addition, the function provided by the support device 300 according to the present embodiment may be realized by using a part of the module provided by the OS.

Although FIG. 5 shows a configuration example in which the processor 302 executes the program to provide necessary functions as the support device 300, some or all of these provided functions may be implemented by using a dedicated hardware circuit (for example, ASIC or FPGA).

D. ONLINE MONITOR

Next, an example of the online monitor provided in the HMI 200 according to the present embodiment will be described.

Figure 6:
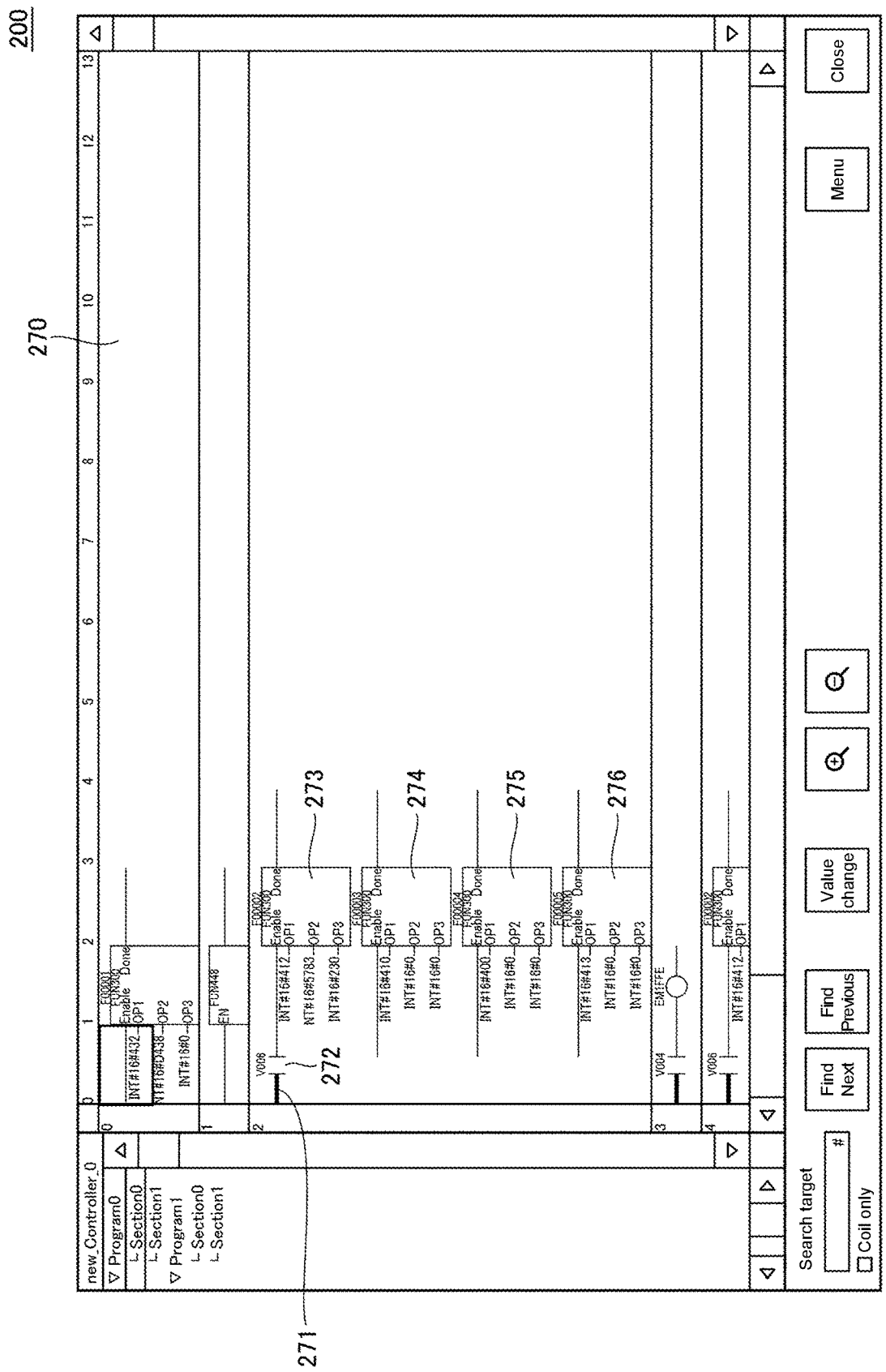
FIG. 6 is a schematic diagram showing an example of the online monitor provided in the HMI according to the present embodiment.

FIG. 6 is a schematic diagram showing an example of the online monitor provided in the HMI 200 according to the present embodiment. Referring to FIG. 6, a sequence circuit 270 defined by the sequence program executed by the target PLC 100 is visualized and provided on the display unit of the HMI 200. The sequence circuit 270 is a combination of one or a plurality of circuit components, and may include a contact corresponding to an input value and a coil corresponding to an output value.

The sequence circuit 270 shown in FIG. 6 includes the contact 272 and functions 273, 274, 275, and 276 as circuit components. In the online monitor, a state value display 271 is added in association with the circuit component according to the state value of the sequence program. In the example shown in FIG. 6, it is shown that the circuit is activated immediately before the contact 272, but the contact 272 itself is off (that is, not activated).

In the present embodiment, the online monitor as shown in FIG. 6 is provided in the HMI 200 communicatively connected to the PLC 100.

E. RELATED ART

Next, an implementation example of an online monitor according to related art of the invention will be described.

Figure 7:
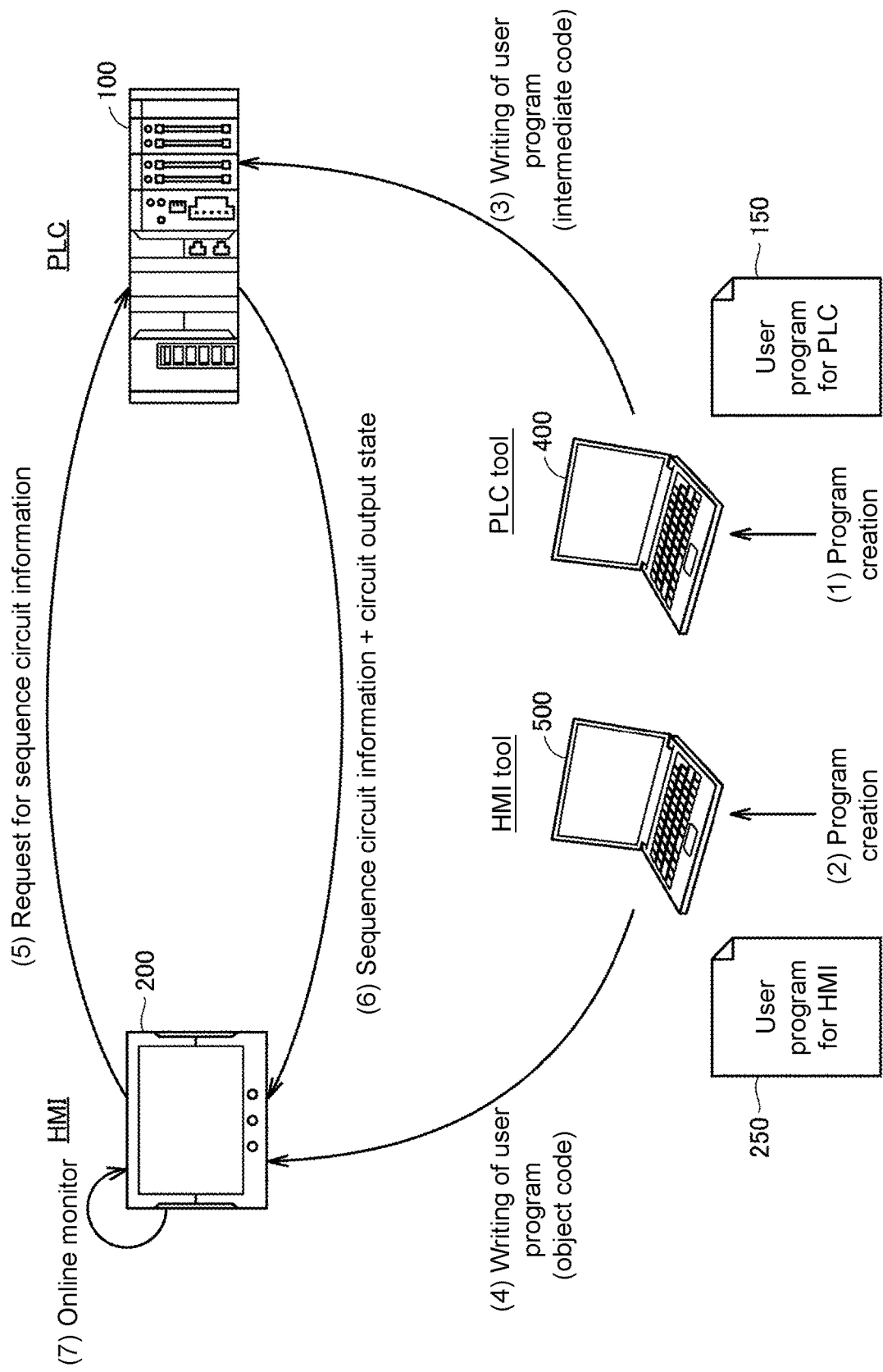
FIG. 7 is a diagram for explaining an implementation example of the online monitor according to related art of the invention.

FIG. 7 is a diagram for explaining an implementation example of the online monitor according to related art of the invention. Referring to FIG. 7, in the related art of the invention, a support device 400 for the PLC 100 and a support device 500 for the HMI 200 are prepared.

In the support device 400 for the PLC 100, a development environment (hereinafter also referred to as "PLC tool") for creating the user program (sequence program, etc.) to be executed by the PLC 100 is provided, and the user creates the user program 150 for PLC according to the control target ((1) program creation).

Further, in the support device 500 for the HMI 200, a development environment (hereinafter also referred to as "HMI tool") for creating the user program (logic or the like for controlling the layout/attribute or display of an object for realizing screen display) to be executed by the HMI 200 is provided, and the user creates the user program 250 for HMI according to the control target ((2) program creation).

The user program 150 for PLC created in the support device 400 is transferred to the PLC 100 ((3) writing of user program (intermediate code)). Similarly, the user program 250 for HMI created in the support device 500 is transferred to the HMI 200 ((4) writing of user program (object code)). The user program 250 for HMI may be converted into an object code in the support device 500 and transferred.

The above-described (1) to (4) are processes for realizing the processing performed by the control system 1. When the processing in the control system 1 is realized, the processing related to the online monitor as shown below can be executed.

That is, when the user instructs the HMI 200 to execute the online monitor, the HMI 200 requests the target PLC 100 for the sequence circuit information ((5) request for sequence circuit information). In response to this request, the PLC 100 responds with the sequence circuit information based on the sequence program stored in advance, and transmits the circuit output state indicating the execution state of the sequence program to the HMI 200 ((6) sequence circuit information+circuit output state). The circuit output state includes the state value (on/off or value) of the circuit component defined in the sequence program. The request for sequence circuit information from the HMI 200 to the PLC 100 may target not only all of the user programs stored in the PLC 100 but only a part thereof.

The HMI 200 visualizes the sequence circuit 270 (see FIG. 6) based on the sequence circuit information and the circuit output state from the PLC 100 ((7) online monitor).

By adopting such a processing procedure, even if the user program executed by the PLC 100 is not stored in the HMI 200, the online monitor can still be realized in the HMI 200.

F. PROBLEM OF THE RELATED ART

The implementation example of the online monitor according to the related art of the invention as shown in FIG. 7 is based on the premise that the circuit components constituting the sequence circuit and the connection relationship can be uniquely specified from the user program (sequence program) stored in the PLC 100.

Figure 8:
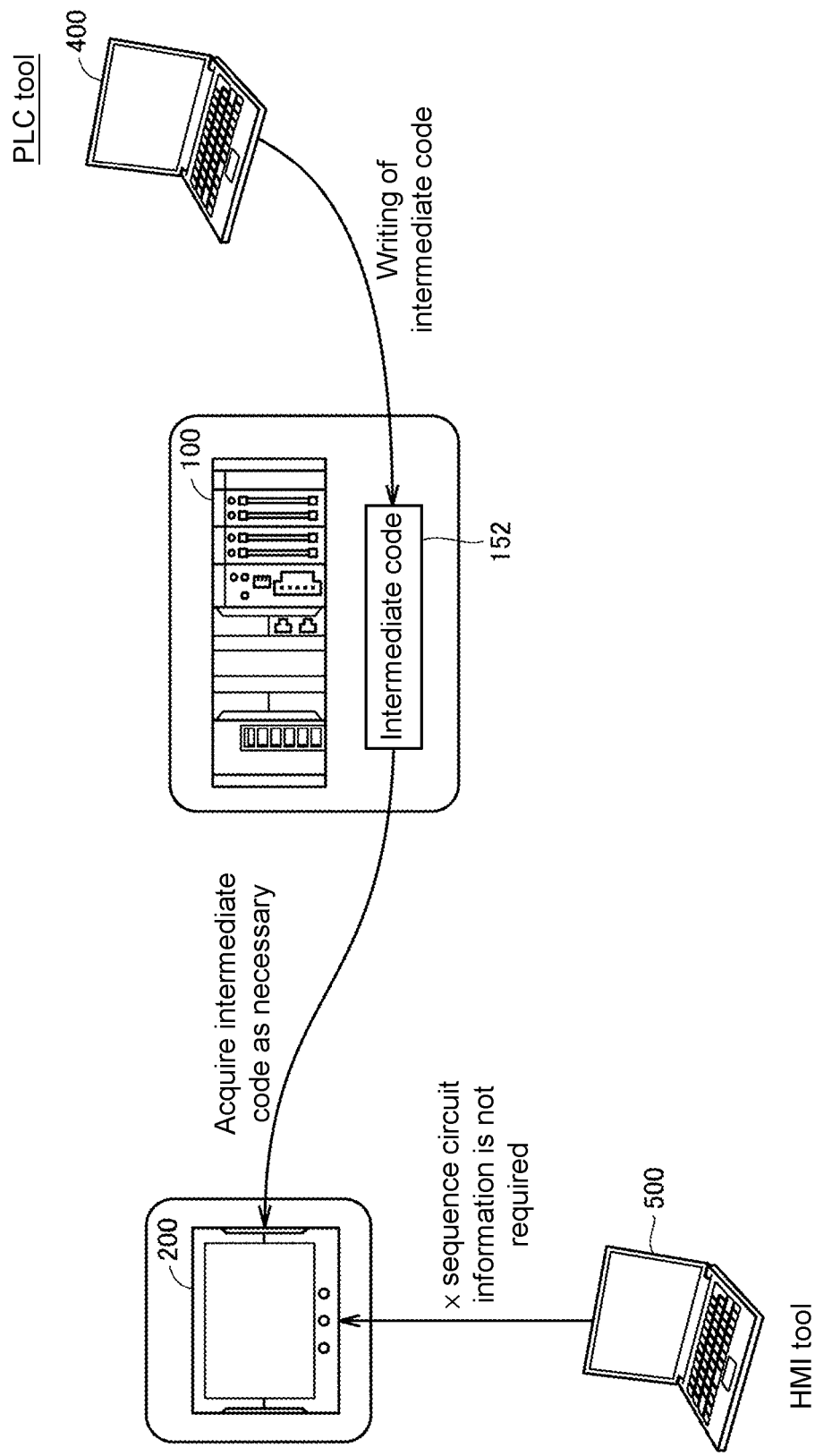
FIG. 8 is a diagram for explaining an implementation example for realizing the online monitor according to related art of the invention.

FIG. 8 is a diagram for explaining an implementation example for realizing the online monitor according to related art of the invention. Referring to FIG. 8, in the related art of the invention, the PLC 100 executes the user program by a kind of interpreter system. More specifically, the PLC 100 sequentially interprets the user program written from the support device 400 for the PLC 100 to generate the native code. In the configuration example shown in FIG. 8, an intermediate code 152 generated from the user program created by the user is written from the support device 400 to the PLC 100. When executing the user program, the PLC 100 sequentially interprets the intermediate code 152 written by the support device 400 to generate the native code (command written in machine language) that can be interpreted by the processor 102 of the PLC 100, so as to execute the user program.

For example, an implementation mode in which the user program written according to IEC61131-3 is sequentially interpreted may be adopted.

Since such an intermediate code 152 corresponds to a code obtained by converting the user program written according to IEC61131-3 according to a predetermined rule, it can be converted bidirectionally with the sequence circuit. That is, since the circuit component corresponding to each code of the intermediate code 152 can be uniquely determined, the corresponding sequence circuit can be restored from the intermediate code 152.

The HMI 200 can acquire the intermediate code 152 from the PLC 100 as necessary, restore the sequence circuit from the circuit component corresponding to each code included in the acquired intermediate code 152, and realize the online monitor. Therefore, it is not necessary to write the sequence circuit of the user program executed by the PLC 100 from the support device 500 for the HMI 200 to the HMI 200.

Figure 9:
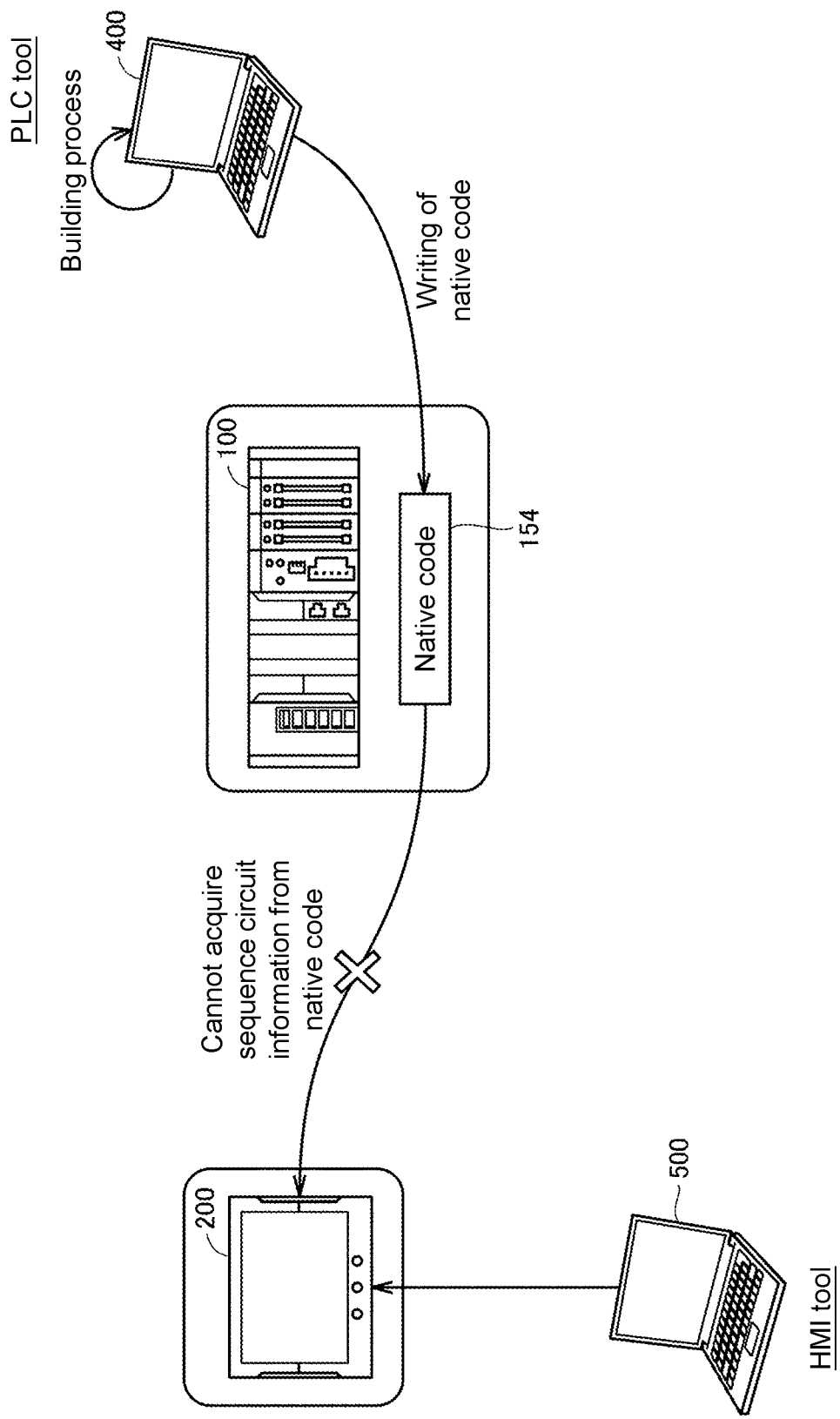
FIG. 9 is a diagram for explaining the problem in the online monitor according to related art of the invention.

FIG. 9 is a diagram for explaining the problem in the online monitor according to related art of the invention. Referring to FIG. 9, depending on the execution environment of the PLC 100, the native code 154, instead of the intermediate code 152, may be written to the PLC 100 from the support device 400 for the PLC 100. That is, the PLC 100 may execute the user program by a compiler system.

In that case, the support device 400 generates the native code 154 by performing a building process (including parsing, optimization, compilation, etc.) on the user program (code written according to IEC61131-3) created by the user. Since the native code 154 can be directly interpreted by the processor 102 of the PLC 100, it has an advantage that the processing speed can be increased as compared with the case of using the intermediate code 152.

On the other hand, such a native code 154 is generated by optimizing the user program written according to IEC61131-3, and basically, reverse conversion into the sequence circuit is not possible. That is, the circuit component corresponding to each code of the native code 154 cannot be uniquely specified, and the corresponding sequence circuit cannot be restored from the native code 154.

Therefore, even if the HMI 200 acquires the native code 154 from the PLC 100, the sequence circuit cannot be restored from the acquired native code 154, so the online monitor cannot be realized by the method described above.

Figure 10:
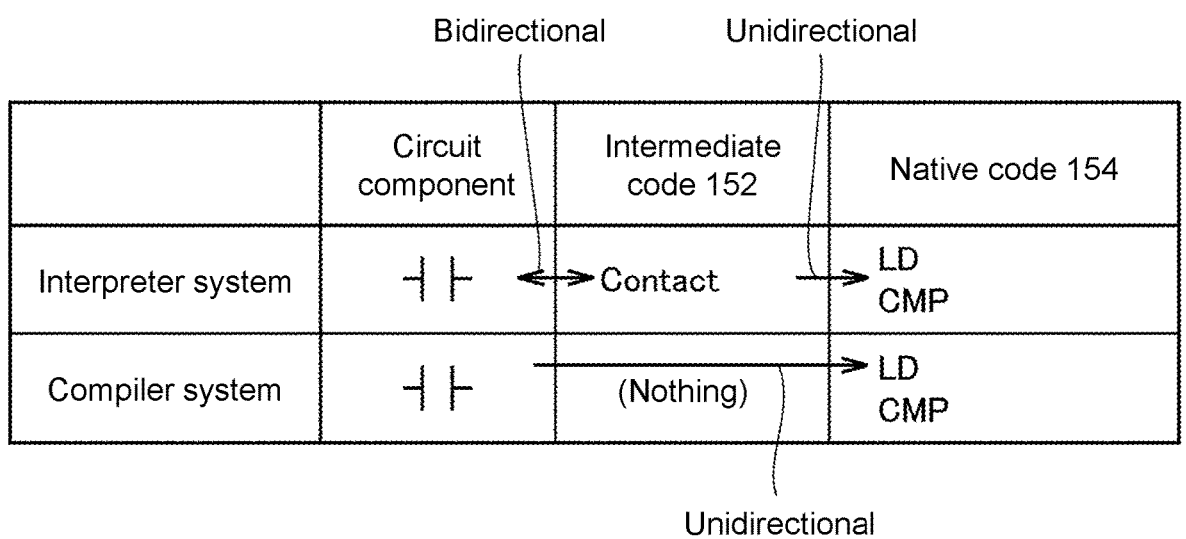
FIG. 10 is a diagram for explaining the difference between the implementation examples of an interpreter system and a compiler system.

FIG. 10 is a diagram for explaining the difference between the implementation examples of the interpreter system and the compiler system. Referring to FIG. 10, the native code corresponding to each circuit component is generated in both the interpreter system and the compiler system.

In the interpreter system, the intermediate code corresponding to each circuit component is generated. The intermediate code cannot be directly interpreted by the processor 102 of the PLC 100, but is linked to the circuit component in a one-to-one relationship. That is, the conversion from the circuit component to the intermediate code is a bidirectional conversion, and reverse conversion from the intermediate code to the circuit component is possible. Then, the native code is generated from the intermediate code. The conversion from the intermediate code to the native code is a unidirectional conversion, and basically, reverse conversion from the native code to the intermediate code is not possible.

In the compiler system, the native code is generated from each circuit component. The native code is a code that can be directly interpreted by the processor 102 of the PLC 100. In the compiler system, since optimization, etc. is performed by the compiler, there is no guarantee that exactly the same native code is generated from the same circuit component. Therefore, the native code cannot be reliably returned to the circuit component. That is, the conversion from the circuit component to the native code is a unidirectional conversion, and basically, reverse conversion from the native code to the circuit component is not possible.

As described above, although the online monitor according to the related art of the invention shown in FIG. 7 can be implemented in the PLC 100 using the interpreter system, it is difficult to be realized in the PLC 100 using the compiler system. Thus, the control system 1 according to the present embodiment provides a configuration that can realize the online monitor even for the PLC 100 using the compiler system.

G. PRESENT EMBODIMENT

Next, the online monitor according to the present embodiment will be described.

(g1: Implementation Example of the Online Monitor)

Figure 11:
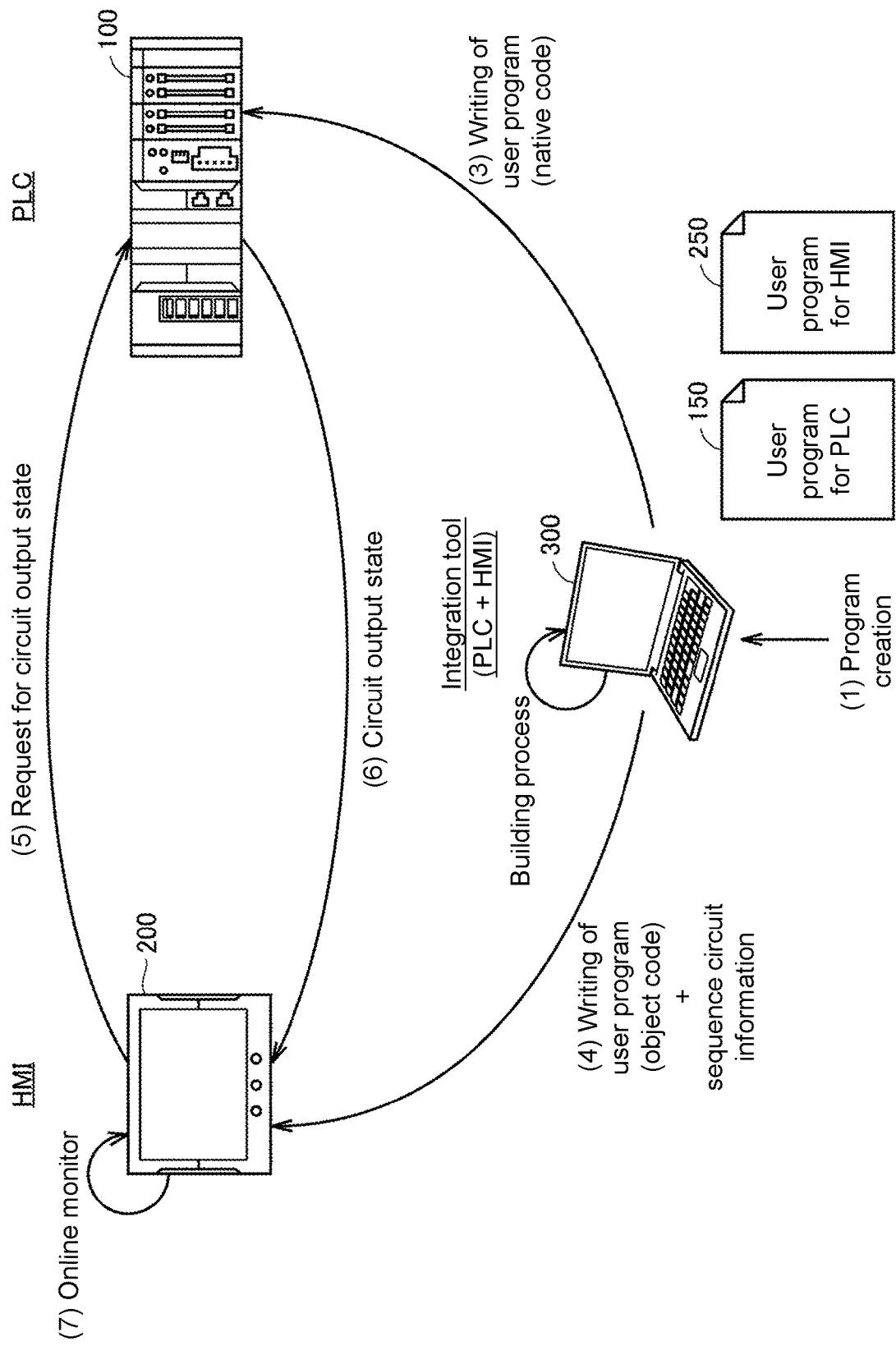
FIG. 11 is a diagram for explaining an implementation example of the online monitor according to the present embodiment.

FIG. 11 is a diagram for explaining an implementation example of the online monitor according to the present embodiment. Referring to FIG. 11, in the present embodiment, a support device 300 is provided, which provides the respective development environments provided by the support device 400 for the PLC 100 and the support device 500 for the HMI 200 shown in FIG. 7. That is, the support device 300 functions as an integration tool that provides the PLC tool and the HMI tool.

The user operates the support device 300 to create the user program 150 for PLC according to the control target and the user program 250 to be executed by the HMI 200 ((1) program creation).

When the program creation is completed, the support device 300 performs a building process on the user program 150 and the user program 250 to generate the native code corresponding to the user program 150 and the object code corresponding to the user program 250 ((2) building process). At this time, the support device 300 also generates the sequence circuit information 156 from the user program 150. The sequence circuit information 156 is information for display used for providing the online monitor in the HMI 200. Details of the sequence circuit information 156 will be described later.

The native code corresponding to the user program 150 created in the support device 300 is transferred to the PLC 100 ((3) writing of user program (native code)). Similarly, the object code corresponding to the user program 250 and the sequence circuit information 156 corresponding to the user program 150 created in the support device 300 are transferred to the HMI 200 ((4) writing of user program (object code)+sequence circuit information).

The above-described (1) to (4) are processes for realizing the processing performed by the control system 1. In this way, the support device 300 creates the user program 150 for PLC and the user program 250 for HMI according to the user operation, and generates the native code 154 and the sequence circuit information 156 from the user program 150, and generates the object code 252 from the user program 250.

When the processing in the control system 1 is realized, the processing related to the online monitor as shown below can be executed.

That is, when the user instructs the HMI 200 to execute the online monitor, the HMI 200 requests the target PLC 100 for the circuit output state ((5) request for circuit output state). In response to this request, the PLC 100 transmits the circuit output state indicating the execution state of the native code being executed to the HMI 200 ((6) circuit output state). The circuit output state includes the state value (on/off or value) of the circuit component defined in the sequence program. The circuit output state transmitted from the PLC 100 to the HMI 200 may include only a part of the state value of the native code being executed in the PLC 100.

The HMI 200 visualizes the sequence circuit 270 (see FIG. 6) based on the sequence circuit information 156 from the support device 300 and the circuit output state from the PLC 100, and provides the online monitor ((7) online monitor).

As shown in FIG. 11, in the present embodiment, by using the support device 300 that integrates the PLC tool and the HMI tool, when the user program 250 for the HMI 200 is written to the HMI 200, information necessary for the online monitor generated from the user program 150 for PLC can be written together to the HMI 200. Thereby, even if the user program 150 is stored in the PLC 100 in the form of a native code, the online monitor can still be provided in the HMI 200.

(g2: Processing Procedure of the Online Monitor)

Figure 12:
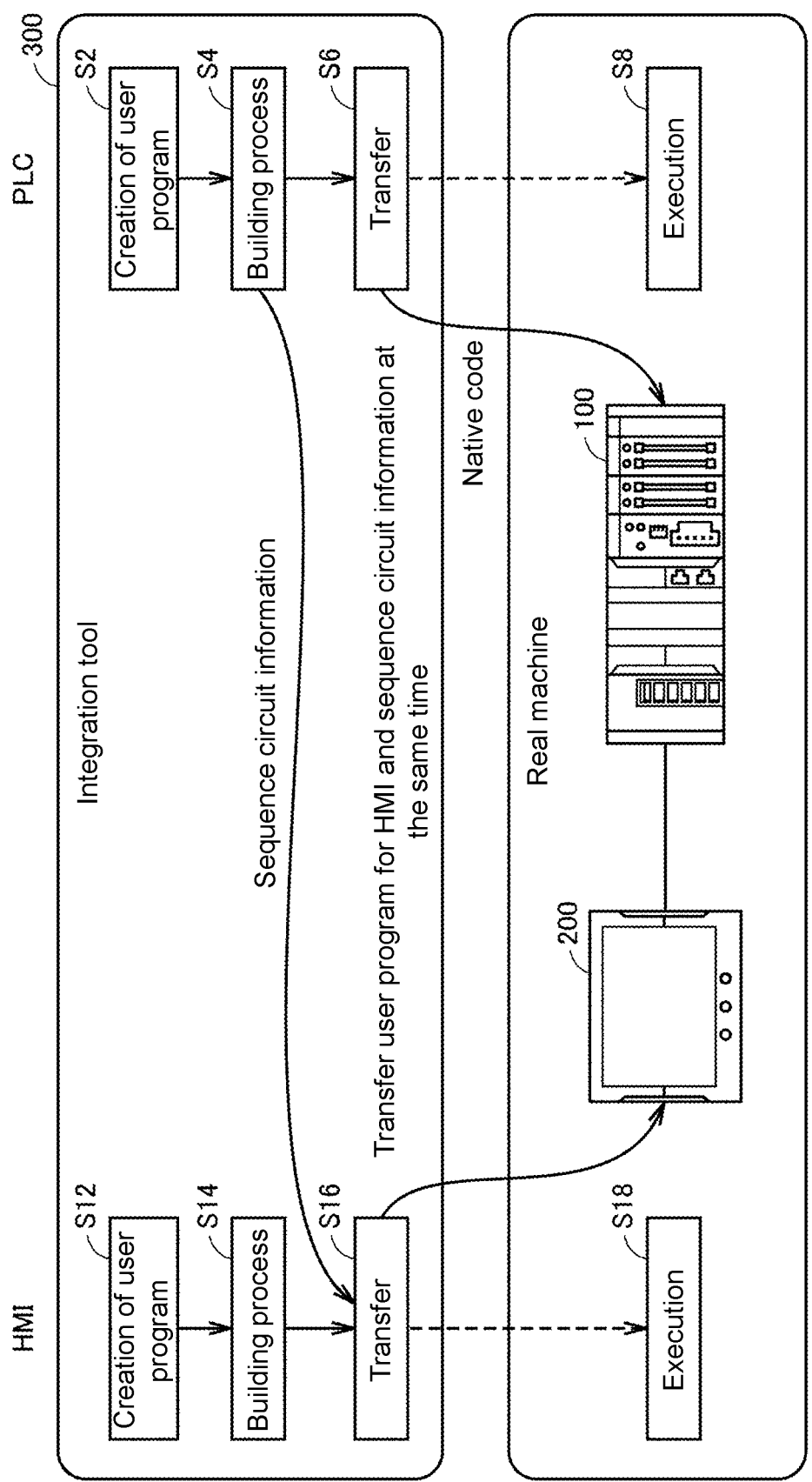
FIG. 12 is a diagram for explaining an example of the processing procedure for realizing the online monitor according to the present embodiment.

FIG. 12 is a diagram for explaining an example of the processing procedure for realizing the online monitor according to the present embodiment. Referring to FIG. 12, in the support device 300 which is an integration tool, the processing for generating necessary data is executed. The steps shown in FIG. 12 are realized by the processor 302 of the support device 300, which is a computer, executing the support program 3062 (see FIG. 5, etc.).

Specifically, with respect to the PLC 100, the support device 300 creates the user program for PLC according to the user operation (step S2). That is, the support device 300 generates the user program 150 including the sequence program, which is executed in the PLC 100, according to the user operation.

Subsequently, the support device 300 executes the building process on the created user program for PLC (step S4), and generates the sequence circuit information 156 in addition to the native code corresponding to the user program. That is, the support device 300 generates, from the user program 150 for PLC, the native code 154 to be executed by the processor 102, which is the calculation processing unit of the PLC 100, and the sequence circuit information 156, which defines the circuit configuration of the sequence program.

Then, the support device 300 transfers the generated native code to the PLC 100 (step S6). Finally, the PLC 100 executes the native code transferred from the support device 300 (step S8).

Further, with respect to the HMI 200, the support device 300 creates the user program 250 for HMI according to the user operation (step S12). That is, the support device 300 generates the user program 250 for realizing the screen display on the HMI 200 according to the user operation.

Subsequently, the support device 300 executes the building process on the created user program 250 for HMI (step S14), and generates the object code corresponding to the user program. That is, the support device 300 generates the object code 252 to be executed by the processor 202, which is the calculation processing unit of the HMI 200, from the user program 250 for HMI.

Then, the support device 300 transfers the sequence circuit information 156 generated in step S4 to the HMI 200 in addition to the generated object code (step S16). That is, the support device 300 transfers the object code 252 and the sequence circuit information 156 to the HMI 200.

Finally, the HMI 200 executes the object code 252 transferred from the support device 300 to realize screen display, and in response to the user operation, provides the online monitor based on the sequence circuit information 156 (step S18).

(g3: Sequence Circuit Information 156)

In the online monitor according to the present embodiment, the sequence circuit showing the contents of the sequence program executed by the target PLC 100 is visualized by providing the sequence circuit information 156 to the HMI 200.

The sequence circuit information 156 is information for visualizing the sequence circuit, and is data created by the support device 300, which is an integration tool, for maintaining the information of the sequence circuit. It is preferable that the sequence circuit information 156 is created in a format that is compact and has a small processing load for interpretation so that even an HMI with limited resources can easily process the information.

Figure 13:
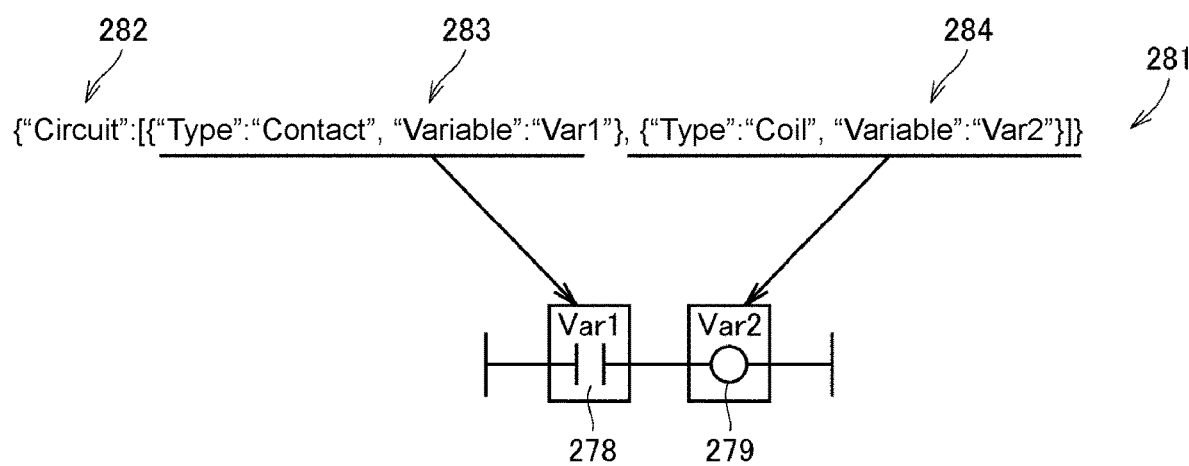
FIG. 13 is a schematic diagram showing an example of the sequence circuit information used in the control system according to the present embodiment.

FIG. 13 is a schematic diagram showing an example of the sequence circuit information 156 used in the control system 1 according to the present embodiment. Referring to FIG. 13, for example, information of the circuit components included in each circuit defined by the user program for PLC is written.

FIG. 13 shows an example of a circuit including one contact 278 and one coil 279. In this example, a circuit definition 281 of the sequence circuit information 156 includes type information 282 indicating the type such as "circuit", and circuit component information 283 and 284 indicating information of the circuit components included in each circuit. The circuit definition 281 shown in FIG. 13 is repeated for the number of circuits defined in the user program.

As described above, the sequence circuit information 156 includes information of the types of circuit components defined and the variables associated with the respective circuit components for each circuit defined in the sequence program.

Nevertheless, the circuit definition 281 shown in FIG. 13 is an example, and any format may be used. In addition, the sequence circuit information 156 may be written in a meta format language such as XML.

(g4: Circuit Output State)

The circuit output state provided from the PLC 100 to the HMI 200 indicates the execution state of the sequence program in the PLC 100. The circuit output state basically includes the value of each variable used by the user program executed in the PLC 100. That is, the circuit output state includes the value of each variable used by the native code 154 executed in the processor 102, which is the calculation processing unit of the PLC 100.

Furthermore, when a function or function block is used in the user program executed in the PLC 100, the value of an internal variable may be included. At this time, the value of a simple variable may be used, or a structure, etc. may be used.

The circuit output state provided from the PLC 100 to the HMI 200 may be updated in a predetermined cycle or each time it is requested.

H. INTERFACE SCREEN EXAMPLE

Next, an example of the interface screen provided by the support device 300 according to the present embodiment will be described.

FIG. 14 is a schematic diagram showing an example of the interface screen 360 provided by the support device 300 according to the present embodiment. FIG. 14 shows an example of the interface screen displayed in the stage of executing the transfer processing from the support device 300 to the HMI 200.

Referring to FIG. 14, in the interface screen 360, a list including a project data item 361, a setting data item 362, a user data item 363, and a sequence circuit information item 364 to be transferred to the HMI 200 is displayed.

The project data 361 item includes a logic or the like for controlling the layout/attribute or display of an object for realizing screen display. The setting data item 362 includes a setting value of the HMI 200 itself and a setting value with respect to the execution environment. The user data item 363 includes authentication information of the user and information defined by the user himself/herself. The sequence circuit information item 364 includes information generated from the user program of the PLC 100 which is the target for providing the online monitor.

The PLC 100 which is the target for transferring the sequence circuit information item 364 to the HMI 200 may be automatically selected by the support device 300 or may be arbitrarily selected by the user.

When the user presses a transfer button 366, the selected data is transferred from the support device 300 to the target HMI 200. In the present embodiment, the sequence circuit information for providing the online monitor is transferred in addition to the data for realizing the screen display, etc. on the HMI 200.

I. APPENDIX

The present embodiment as described above includes the following technical ideas.

[Configuration 1]

A control system (1), comprising:
a control device (100) for controlling a control target; and
a display device (200) connected to the control device,
wherein the control device comprises:
a storage unit (106) storing a native code (154) generated from a first user program (150) that comprises a sequence program; and
a calculation processing unit (102) executing the native code stored in the storage unit,
wherein the display device comprises:
a storage unit (206) storing sequence circuit information (156) that is generated from the first user program and defines a circuit configuration of the sequence program; and
a monitor functioning unit (260) acquiring a circuit output state indicating an execution state of the native code from the control device, and visualizing an execution state of the sequence program in the control device based on the sequence circuit information and the acquired circuit output state.

[Configuration 2]

The control system according to configuration 1, wherein the circuit output state comprises a value of each variable being used by the native code executed in the calculation processing unit.

[Configuration 3]

The control system according to configuration 2, wherein the sequence circuit information comprises, for each circuit defined in the sequence program, information (281) of a type of a circuit component defined and a variable associated with each circuit component.

[Configuration 4]

The control system according to any one of configurations 1 to 3, wherein the storage unit of the display device further stores an object code (252) generated from a second user program (250) for realizing a screen display on the display device.

[Configuration 5]

The control system according to configuration 4, further comprising a support device (300) which creates the first user program and the second user program according to a user operation, and generates the native code and the sequence circuit information from the first user program and generates the object code from the second user program.

[Configuration 6]

A support device (300) for a control system (1) which comprises a control device (100) for controlling a control target and a display device (200) connected to the control device, the support device comprising:

a means (S2) generating a first user program (150) comprising a sequence program, which is executed in the control device, according to a user operation;

a means (S12) generating a second user program (250) for realizing a screen display on the display device according to a user operation;

a means (S4) generating a native code (154) to be executed by a calculation processing unit of the control device, and sequence circuit information (156) defining a circuit configuration of the sequence program from the first user program;

a means (S14) generating an object code (252) to be executed by a calculation processing unit of the display device from the second user program;

a means (S6) transferring the native code to the control device; and a means (S8) transferring the object code and the sequence circuit information to the display device.

[Configuration 7]

A non-transient computer-readable recording medium, recording a support program (3062) for a control system (1) which comprises a control device (100) for controlling a control target and a display device (200) connected to the control device, the support program enabling a computer (300) to execute:

a step (S2) of generating a first user program (150) comprising a sequence program, which is executed in the control device, according to a user operation;

a step (S12) of generating a second user program (250) for realizing a screen display on the display device according to a user operation;

a step (S4) of generating a native code (154) to be executed by a calculation processing unit of the control device, and sequence circuit information (156) defining a circuit configuration of the sequence program from the first user program;

a step (S14) of generating an object code (252) to be executed by a calculation processing unit of the display device from the second user program;

a step (S6) of transferring the native code to the control device; and a step (S8) of transferring the object code and the sequence circuit information to the display device.

In the case where the online monitor of the interpreter system control device is provided, by acquiring the intermediate code executed by the control device, the sequence circuit information can be uniquely restored, and thereby the online monitor can be provided without preparing a special mechanism for the display device.

On the other hand, in the case where the online monitor of the compiler system control device is provided, even if the native code executed by the control device is acquired, it is basically impossible to restore the sequence circuit information, and it is difficult to provide the online monitor.

In contrast thereto, in the control system according to the present embodiment, by using the support device which is an integration tool that provides the PLC tool and the HMI tool, the circuit information of the user program (sequence program) executed by the control device can also be provided when data is transferred to the display device, and thereby the online monitor can be provided easily even for the control device that stores and executes the native code.

The embodiments disclosed here should be considered illustrative in all aspects and not restrictive. The scope of the invention is defined not by the above description but by the claims, and is intended to cover meanings equivalent to the claims and all modifications within the scope.

What is claimed is:

1. A control system, comprising:
   a control device for controlling a control target; and
   a display device connected to the control device,
   wherein the control device comprises:
     a first storage device storing a native code generated from a first user program that comprises a sequence program; and
     a processor executing the native code stored in the first storage device,
   wherein the display device comprises:
     a second storage device storing sequence circuit information that is generated from the first user program and defines a circuit configuration of the sequence program; and
     a processor acquiring a circuit output state indicating an execution state of the native code from the control device, and visualizing an execution state of the sequence program in the control device based on the sequence circuit information and the acquired circuit output state.

2. The control system according to claim 1, wherein the circuit output state comprises a value of each variable being used by the native code executed in the processor.

3. The control system according to claim 2, wherein the sequence circuit information comprises, for each circuit defined in the sequence program, information of a type of a circuit component defined and a variable associated with each circuit component.

4. The control system according to claim 1, wherein the second storage device of the display device further stores an object code generated from a second user program for realizing a screen display on the display device.

5. The control system according to claim 4, further comprising a support device which creates the first user program and the second user program according to a user operation, and generates the native code and the sequence circuit information from the first user program and generates the object code from the second user program.

6. A support device for a control system which comprises a control device for controlling a control target and a display device connected to the control device, the support device comprising:
   a storage device, and
   a processor coupled to the storage device and configured to:
   generate a first user program comprising a sequence program, which is executed in the control device, according to a user operation;
   generate a second user program for realizing a screen display on the display device according to a user operation;
   generate a native code to be executed by a calculation processing unit of the control device, and sequence circuit information defining a circuit configuration of the sequence program from the first user program;

generate an object code to be executed by a calculation processing unit of the display device from the second user program;

transfer the native code to the control device; and transfer the object code and the sequence circuit information to the display device.

7. A non-transient computer-readable recording medium, recording a support program for a control system which comprises a control device for controlling a control target and a display device connected to the control device, the support program enabling a computer to execute:

generating a first user program comprising a sequence program, which is executed in the control device, according to a user operation;

generating a second user program for realizing a screen display on the display device according to a user operation;

generating a native code to be executed by a calculation processing unit of the control device, and sequence circuit information defining a circuit configuration of the sequence program from the first user program;

generating an object code to be executed by a calculation processing unit of the display device from the second user program;

transferring the native code to the control device; and transferring the object code and the sequence circuit information to the display device.

8. The control system according to claim 2, wherein the second storage device of the display device further stores an object code generated from a second user program for realizing a screen display on the display device.

9. The control system according to claim 3, wherein the second storage device of the display device further stores an object code generated from a second user program for realizing a screen display on the display device.

* * * * *